United States Patent [19]

Ford, Jr.

[11] Patent Number: 5,659,895
[45] Date of Patent: Aug. 26, 1997

[54] FULL-BODY STRESS TRANSFER SUIT

[76] Inventor: Thomas J. Ford, Jr., 20 Ashville Rd., Newton Lower Falls, Mass. 02162

[21] Appl. No.: 19,015

[22] Filed: Feb. 18, 1993

[51] Int. Cl.$^6$ ................................................ A41D 13/00
[52] U.S. Cl. ...................... 2/2.11; 2/69; 2/79; 602/61; 482/124
[58] Field of Search ................ 2/2.11, 79, 69, 2/2.12, 2.13, 2.14, 2, 243.1, 16, 22; 482/121, 122, 124, 128, 148; 602/19, 60–65, 75; 601/23, 1; 87/2, 3

[56] References Cited

U.S. PATENT DOCUMENTS

| | | | |
|---|---|---|---|
| 1,281,538 | 10/1918 | Dupuy | 602/61 |
| 2,008,152 | 7/1935 | Nier | 2/79 |
| 3,081,459 | 3/1963 | Clark . | |
| 3,096,635 | 7/1963 | Somyk | 66/175 |
| 3,279,465 | 10/1966 | Cherio et al. | 87/2 |
| 3,307,546 | 3/1967 | Cherio et al. | 87/2 |
| 3,396,406 | 8/1968 | Gongwer | 602/60 |
| 3,419,003 | 12/1968 | Krauss et al. | 602/60 |
| 3,422,458 | 1/1969 | Schueller . | |
| 3,428,960 | 2/1969 | Schueller . | |
| 3,805,781 | 4/1974 | Hory | 602/75 |
| 3,934,583 | 1/1976 | Hollingsbead et al. | 602/62 |
| 4,065,814 | 1/1978 | Fox | 482/124 |
| 4,400,832 | 8/1983 | Kinder . | |
| 4,507,801 | 4/1985 | Kavanagh et al. | 2/2 |
| 4,608,716 | 9/1986 | Brumfield | 2/79 |
| 4,722,099 | 2/1988 | Kratz | 2/79 |
| 4,910,802 | 3/1990 | Malloy | 22/227 |
| 5,038,414 | 8/1991 | Freeman | 66/178 A |
| 5,050,406 | 9/1991 | Strauss et al. | 66/177 |
| 5,052,052 | 10/1991 | Gilford et al. | 2/69 |
| 5,091,992 | 3/1992 | Resic | 2/2 |
| 5,099,860 | 3/1992 | Amrein | 602/65 |
| 5,109,546 | 5/1992 | Dicker | 2/79 |
| 5,171,211 | 12/1992 | Deasy, Jr. | 602/61 |
| 5,267,951 | 12/1993 | Ishii | 602/20 |
| 5,308,305 | 5/1994 | Romney | 482/121 |

FOREIGN PATENT DOCUMENTS

| | | | |
|---|---|---|---|
| 2000624 | 7/1971 | Germany | 2/2.11 |

OTHER PUBLICATIONS

A.E. Nicogossian and J.F. Parker, Space Physiology and Medicine, NASA, Washington, D.C., 1982.

Mechanic, G.L.; Arnaud, S.B.; Boyde, A.; Bromage, T.G.; Buckendahl, P.; Elliot, J.; Katz, E.P.; Durnova, G.N., Regional Distribution of Mineral and Matrix in the Femurs of Rats Flown on Cosmos 1887 Biosatellite, Faseb J., 4; 34–40, 1990.

Doty, S., Effects of Microgravity on Rat Bone, Cartilage and Connective Tissues, NASA, Ames Research Center, The U.S. Experiments Flown on the Soviet Biosatellite Cosmos, 1887, pp. 51–56.

(List continued on next page.)

*Primary Examiner*—Amy B. Vanatta
*Attorney, Agent, or Firm*—Wolf, Greenfield & Sacks, P.C.

[57] ABSTRACT

A stress transfer garment for an individual in a low gravity environment to minimize bone deconditioning and the migration of fluids to the torso. The garment includes members made of elastic or resilient material which cover the torso and multiple limbs. The members extend down the long axis of the body, with each member interlaced with the member on each side at least once to form a mesh-like structure. The garment is fitted for an individual in a first position, preferably the fetal position. Any movement by a part of the body covered by the members from the fetal position, stretches those members. The stretched members deliver a physical strain along the long axis of the body to the underlying bone structure. The garment may also be designed to deliver a physical strain across the short axis of the body which is greater across the torso than the limbs and is sufficient to prevent body fluids from the limbs from migrating to the torso. The garment may be formed as a one-piece or two-piece garment.

14 Claims, 7 Drawing Sheets

OTHER PUBLICATIONS

Vailas, A.; Zernicke, R.; Grindelande, R.; Kaplanski, A; Biomedical, Biochemical and Morphological Alterations of Muscle and Dense Fibrous Connective Tissues During 14 Days of Space Flight.

Holton, E., et al., Part 1: Gravity and Skeletal Growth; Part 2: Morphology and Histochemistry of Bone Cells and Vasculature of the Tibia; Part 3: Nuclear Volume Analysis of Osteoblast Histiogenesis in Periodontal Ligament Cells; Part 4: Intervetebral Disc Swelling Pressure Associated with Migrogravity, NASA, Ames Research Center, The U.S. Experiments Flown on the Soviet Biosatellite Cosmos 1887, pp. 113–149, Feb., 1990.

Simmons, D.; Grynpas, M.; Rosenberg, G.; Durnova, G.; The Maturation of Bone and Dentin Matrices in Rats Flown on Cosmos 1887 pp. 157–168, Feb., 1990 NASA, Ames Research Center, The U.S. Experiments Flown on the Soviet Biosatellite Cosmos 1887 pp. 157–168, Feb. 1990.

Patterson–Buckendahl, P.; Globus, R.K.; Bikle, D.D.; Cann, C.E.; Morey–Holton, E.; Effects of simulated weightlessness on rat osteocalcin and bone calcium, American J. of Physiology, vol. 26, 1989, pp. R1103–R1109.

Stupakov, G.P.; Kazeikin, V.S.; Morukov, B.V.; Microgravity–induced changes in human bone strength, The Physiologist, vol. 32, Feb. 1989, pp. S–41 to S–44.

Ziegler, J.; Life beyond gravity, Air and Space, Dec. 1989/Jan. 1990, pp. 81–87.

Droppert, P.M.; The effects of microgravity on the skeletal system–A review, Journal of the British Interplanetary Society, vol. 43, pp. 19–24, 1990.

Goode, A.W.; Rambut, P.C.; The Skeleton in Space, Nature, vol. 317, Sep. 1985, pp. 204–205.

O.G. Gazenko, A.M. Genin & A.D. Egorov, Major Medical Results of the Salyut 6–Soyuz 185–day space flight, 32nd Congress of the Int'l. Astronautical Federation, Rome, 1981.

R.K. Globus, D.D. Bikle, E. Morey–Holton, Effects of Simulated Weightlessness on Bone Mineral Metabolism, Endocrinology, vol. 114, No. 6, 1984, pp. 2264–2270.

D.A. Pabst, Axial Muscles and Connective Tissues of the Bottle–nose Dolphin, The Bottlenose Dolphin, Ed. Stephen Leatherwood and Randall Reeves Academic Press, Harcourt Brace Jovanovich, Publishers, 1990, pp. 51–67.

FULL-BODY STRESS TRANSFER SUIT

FIELD OF THE INVENTION

This invention relates to a garment for use in a low gravity environment and more specifically to a garment for use in a low gravity environment to maintain bone structure responsive to weight bearing stresses and to minimize the migration of body fluids to the torso. It will also be used to prevent and treat osteoporosis in children.

BACKGROUND OF THE INVENTION

To adapt to an environment with gravitational forces, physiological systems in the body have evolved which depend on gravity. One system in the body dependent upon gravity is bone structure. Bones, such as the femur, tibia, and fibula in the legs, the humerus, radius, and ulna in the arms, and vertebra in the back are maintained in response to weight bearing stresses caused by gravity. Another system in the body dependent upon gravity is body fluid distribution. Hydrostatic pressure in the vascular system, resulting from gravitational forces, maintains the distribution of fluids in the torso and limbs. The maintenance of these systems is desirable in a zero gravitational environment.

Exposure to a weightless environment, results in the deconditioning of gravity dependent physiological systems. Without gravitational forces, weight bearing stresses and hydrostatic pressure are lost. As a result, the body no longer maintain bones responsive to weight bearing stresses and body fluids migrate from the limbs to the torso. Although these responses are merely natural adaptations by the body to the weightless environment, there are concerns about the short and long term effects of these changes.

While in a weightless environment, the redistribution of body fluids has the undesirable effect of causing hemoconcentration and relative dehydration. Upon returning to a gravitational environment, the loss in bone structure often requires the body to undergo substantial reconditioning to regain the loss in bone structure. Additionally, the redistribution of body fluids often results in orthostatic hypertension. Attempts to minimize or prevent the above described deconditioning of the bone structure and the migration of bodily fluids have not been successful.

One attempted approach to minimize deconditioning of bone structure involves the performance of extensive exercises for short periods of time while in a weightless environment. These exercise periods have helped maintain some bone structure, however the amount maintained has been nominal. Additionally, these exercise periods have used up valuable time during space travel which could have been used for other purposes.

Another attempted approach to minimize the deconditioning of bone structure involves the use of dietary supplements, particularly calcium and hormone supplements. The supplements are taken to replenish calcium and other nutrients lost and to try and stimulate growth. The practice of taking these supplements has not had any effect. Apparently, without weight bearing stresses on the bone structure, the human body does not need these additional supplements and simply excretes them.

Another attempted approach to minimize the deconditioning of bone structure involves taking tetracycline. Tetracycline is known to have an effect on osteoclasts, at least for a short period of time. Osteoclasts are responsible for the loss or gain of calcium and bone mass in response to weight bearing stress. Apparently, taking tetracycline reduces or eliminates the amount of calcium and bone mass lost while in a weightless environment. Unfortunately, taking tetracycline poses a substantial health hazard to the individual using the drug, as explained below.

Allergic reactions to the use of tetracycline frequently develop, requiring treatment with immunosuppressive drugs. Although the allergic reaction can usually be treated successfully with immunosuppressive drugs, the use of these drugs increases the risk of infection from normally benign organisms. Prolonged use of a broad spectrum antibiotic, like tetracycline, can suppress many benign bacterial populations. This in turn leads to an overgrowth of organisms that are not sensitive to the drug. Mixed populations of microorganisms keep each other in check while unbalanced microbial populations can cause disease. Infections caused by a normally benign organism are difficult to treat and are fatal in a high percentage of cases. Thus, the use of tetracycline to preserve bone structure poses two significant health risks.

Another attempted approach to minimize the deconditioning of bone structure involves the use of a set of suspenders. The suspenders deliver a physical load to the bone structure which stimulates bone maintenance. Although the suspenders deliver some physical load to the bones, the design does not deliver a sufficient physical load to significantly minimize or eliminate deconditioning of the overall bone structure.

One attempted approach to minimize the migration of body fluids to the torso from the limbs, involves the use of a suction bag which surrounds the lower extremities. The suction bag creates a pressure which draws fluids away from the torso of the individual to the lower extremities. Unfortunately, the suction bag is cumbersome to wear and thus can not be used all the time. Additionally, the negative pressure produced on the legs is painful.

Accordingly, it is an object of this invention to provide a garment for minimizing the loss in bone structure in a low gravity environment.

Another object of this invention is to provide a garment for minimizing the migration of fluids to the torso in a low gravity environment.

Another object of this invention is to provide a garment which eliminates the need for exercise periods to minimize the loss in bone structure in a low gravity environment.

Another object of this invention is to provide a garment which eliminates the need for the use of drugs to minimize the loss in bone structure in a low gravity environment. It will be used to treat osteoporosis in children.

Other objects and advantages will become apparent from the following description of the invention.

SUMMARY OF THE INVENTION

A garment for use in a low or no gravity environment to maintain bone structure responsive to weight bearing stresses and to minimize the migration of body fluids to the torso. The garment has members formed from elastic or resilient material which cover the torso and multiple limbs. Each member interlaces with the member on each side at least once to form a mesh-like structure. The garment is custom fit to the individual in a first position. Preferably, the first position is the fetal position which represents the minimal volume for the human frame. Whenever a part of the body covered by the members is moved from the fetal position, the members covering that part of the body stretch. The stretched members deliver a physical strain along the long axis of the body and limbs to the underlying bone structure. The long axis of the body extends along the body from the head to the feet. The strain from the stretched members must be sufficient to maintain bone structure responsive to weight bearing stresses. Preferably, the stretched members deliver a physical strain along the long axis of the body and limbs equal to 100% of the individual's body weight.

The garment may also be designed to deliver a physical strain along the short axis of the body which is greater across the torso than the limbs. The short axis of the body is perpendicular to the long axis. The short axis physical strain must be sufficient to minimize the migration of body fluids from the limbs to the torso, without restricting normal blood flow.

The present invention may also be used in the treatment of pediatric osteoporosis and juvenile neuropenia. Pediatric osteoporosis, unlike post-menopausal osteoporosis, is similar to microgravity induced bone loss. Suits of the same design as will be described herein can be used to apply stress to developing bones. This stress will cause bone remodeling following Wolff's Law. Mechanical stress is needed to allow the conversion of osteoblast precursor cells into active bone forming cells. Children suffering from fractures of osteoporotic origin can have active treatment of the condition from the present invention.

The garment can be made as a one or two piece garment. The one piece garment is put on through an opening across the shoulders. The two piece garment is put on like a shirt and a pair of pants. The shirt and pants can be separately secured around the waist or to each other.

BRIEF DESCRIPTION OF THE DRAWINGS

For a full understanding of the nature and object of the invention, reference should be had to the following detailed description taken in conjunction with the accompanying drawings, in which.

DETAILED DESCRIPTION

Figure 1A:
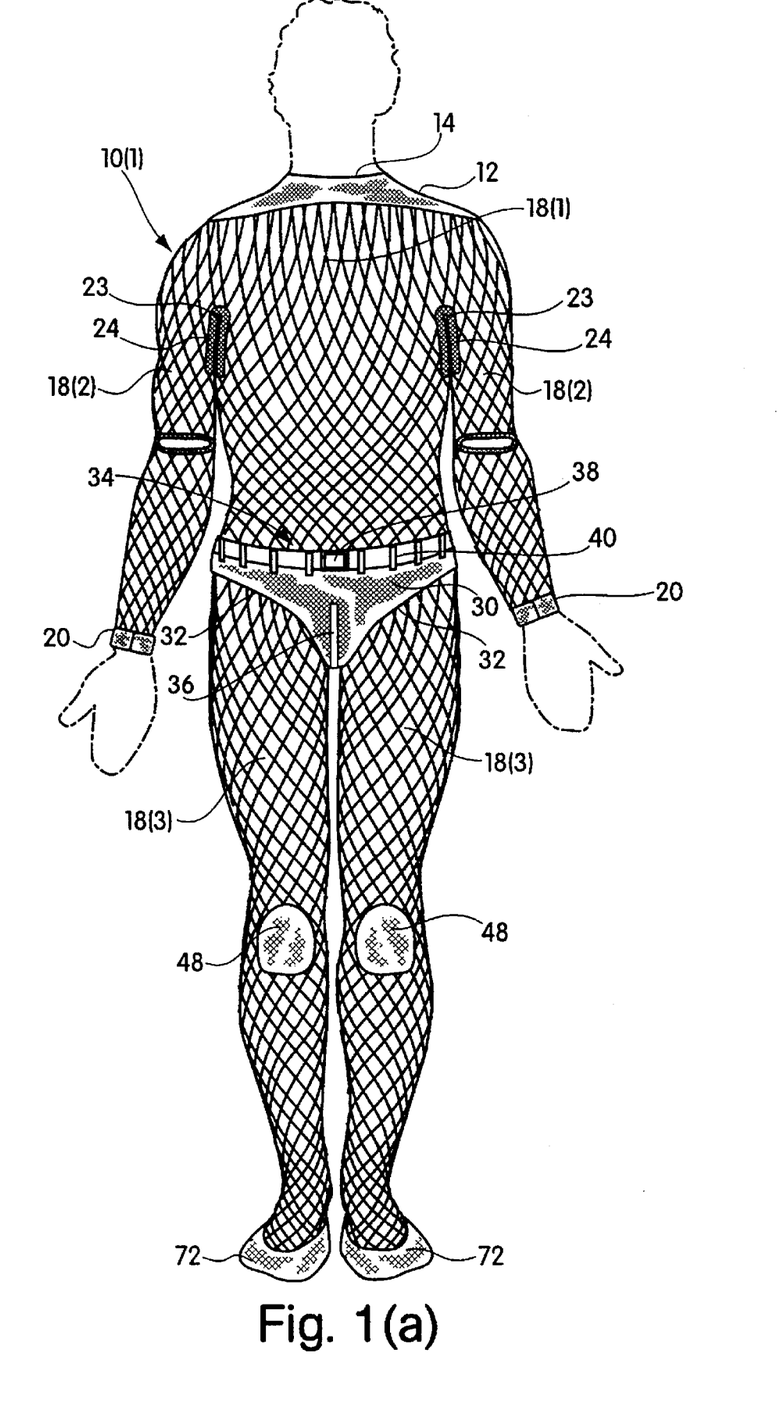
FIG. 1(a) is a front view of a stress transfer garment worn by an individual in an orthostatic position in accordance with a first embodiment of the invention.
Figure 1B:
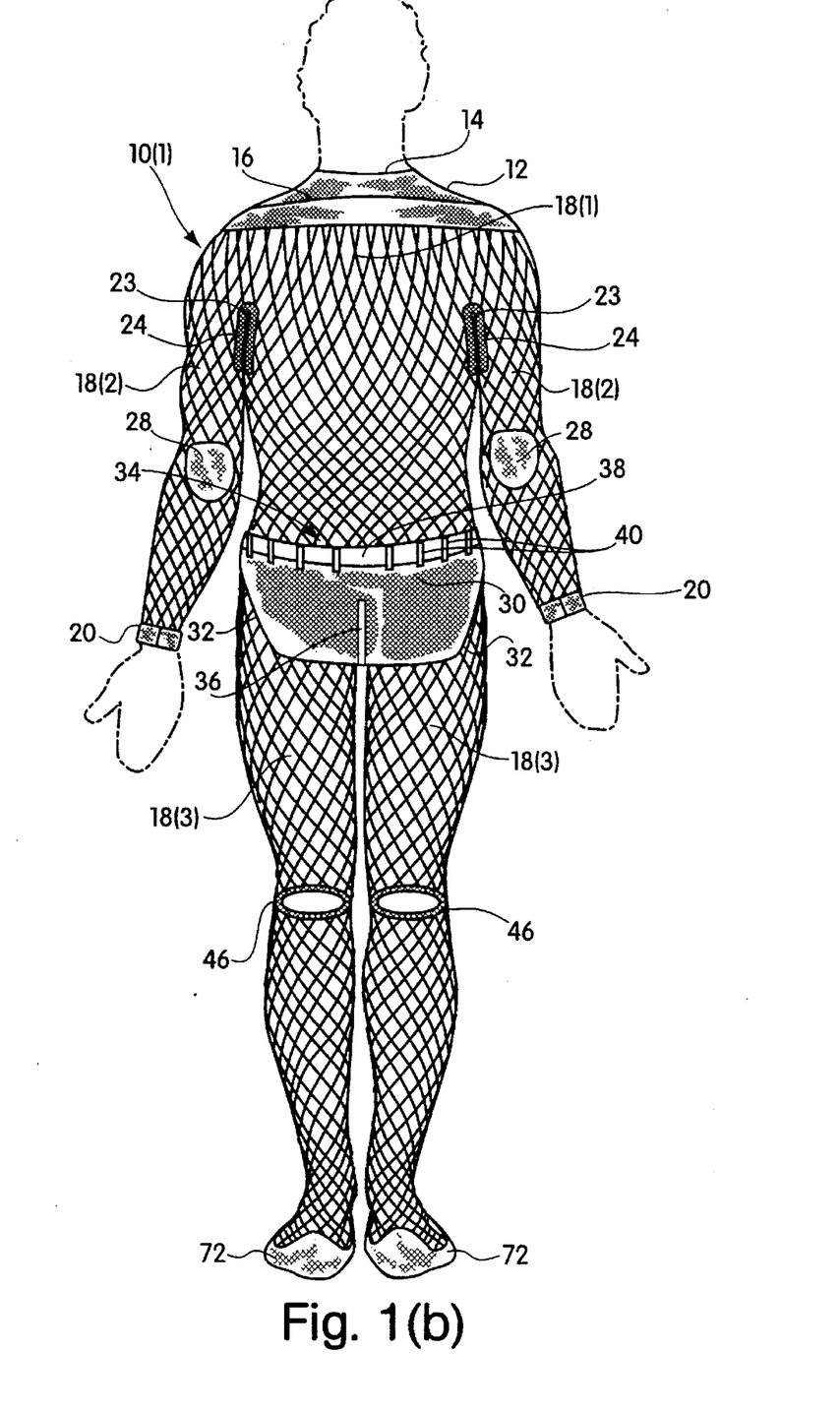
FIG. 1(b) is a back view of the one-piece stress transfer garment shown in FIG. 1(a).

Referring to the figures, FIG. 1(a) is a front view of a stress transfer garment 10(1) worn by an individual in an orthostatic position in accordance with a first embodiment of the invention and FIG. 1(b) is a back view of the garment 10(1) shown in FIG. 1(a). The garment is a one-piece suit which is intended for use by an individual in a low or no gravity environment for maintenance of bones which are responsive to weight bearing stresses and to minimize the migration of body fluids from the limbs to the torso.

More specifically, a full-width shoulder pad 12 is seated over the shoulders of the individual. The pad 12 provides a neck opening 14 which must be made large enough for the individual's head to pass through. The pad 12 also includes a zipper 16 [See FIG. 1(b)]. Typically, the zipper 16 will be disposed along the width of the back of the shoulder pad 12. The opening provided by the zipper 16 must be large enough to allow the individual access to get into the garment 10(1). The zipper 16 may be extended to the upper arm area to accommodate the larger hips of women. Although a zipper 16 is shown, any type of device which provides access to the garment 10(1) and can secure the opening could be used, such as an arrangement with Velcro strips. Preferably, the pad 12 is made from a non-stretch material which permits sweat to escape for general comfort.

The pad 12 is an anchor for a plurality of elastic members 18(1) and 18(2). One end of each member 18(1) and 18(2) is secured along the edges of the pad 12, with the members 18(1) and 18(2) extending down along the upper torso and the arms, respectively. As the members 18(1) and 18(2) descended down from the pad 12, each member 18(1) and 18(2) periodically interlaces with the member on either side creating a mesh-like structure. The interlacing members surround the upper torso and each arm of the individual.

An arm cuff 20 is detachably secured around the lower part of each arm of the individual. The other ends of each of the members 18(2) surrounding each arm are secured to the respective arm cuff 20. Each arm cuff 20 must be sufficiently secured around the lower part of the arm to prevent the members 18(2) from dislodging the cuff 20 from the secured position. In this embodiment, the arm cuff 20 is an adjustable Velcro strap. Although an arm cuff 20 is shown, any device which can secure the other ends of the members 18(2) surrounding each arm to the lower part of the arm can be used, such as a modified glove 22 [see FIGS. 4(a) and 4(b)].

The garment 10(1) may also have a pair of axillary openings 23. To provide the axillary openings 23 under each arm, the members 18(2) located under each armpit may be cut out. An axillary pad 24 may be used to secure the cut ends of the members 18(2) at each armpit region. The pads 24 would permit the underarm areas to sweat freely. Preferably, each axillary pad 24 is made from a material, such as natural fibers, e.g., cotton, which allows for sweat to escape. The cut ends of the members 18(2) at each axillary opening 23 may also be secured by an axillary securing member 25 leaving a ventilation opening under each arm [see FIG. 4(a)].

A pair of elbow flexures 26 may also be included, with each elbow flexures 26 integrally connected with the members 18(2) over the front of one of the elbows. Typically, the members 18(2) located over the front of the elbow are cut and the ends of the cut members 18(2) are secured to the edges of an elbow flexure 26. The elbow flexures 26 enable the arms to bend more easily. Preferably, each elbow flexure 26 is made from a material, such as cotton, which allows sweat to escape.

A pair of elbow pads 28 may also be included, with each elbow pad 28 integrally connected with the members 18(2) over the back of one of the elbows [see FIG. 1(b)]. Typically, the members 18(2) located over the back of the elbow are cut and the ends of the cut members 18(2) are secured to the edges of an elbow pad 28. The elbow pads 28 have sufficient padding to protect the elbow. Preferably, each elbow pad 28 is made from a non-elastic material.

A brief 30 surrounds the lower torso and provides a pair of leg openings 32 and a waist opening 34. The leg openings 32 and waist opening 34 must be large enough to receive the legs and waist of the individual. The brief 30 includes a zipper 36 or other device, such as Velcro strips, which provides access to the crotch area for the performance of excretory functions. Typically, the brief 30 is made from a non-stretch material to provide a pressure free area over the lower torso, particularly the crotch area, for general comfort. Preferably, the brief 30 is made from a non-stretch material which permits sweat to escape.

The brief 30 anchors the other end of the members 18(1) surrounding the upper torso around the waist opening 34 of the brief 30. The brief 30 may include a belt 38 and a series of belt loops 40 to assist in anchoring the other end of members 18(1). The belt loops 40 are connected to the brief 30 adjacent the waist opening 34. The belt 38 is passed through the belt loops 40 and around the waist. Tightening the belt 38 around the waist prevents the members 18(1) from pulling the brief 30 up the torso. In this embodiment, the belt 38 is an adjustable Velcro strap.

Elastic members 18(3), similar to those discussed earlier, are used to surround each leg. One end of the elastic members 18(3) surrounding each leg are secured to one of the leg openings 36. The members 18(3) extend down each leg from the leg openings 36, with each member 18(3) periodically interlacing with the member 18(3) on either side creating a mesh-like structure.

The other ends of each of the members 18(3) surrounding each leg are secured to a modified shoe 44. The modified shoes 44 each include a foot pad 72 located under each foot and heel to which the other ends are secured. Preferably, each foot pad 72 is formed from a non-resilient, dimensionally stable material, such as shoe leather. Typically in a gravitational environment, the achilles ligaments support a large portion of the individual's weight when the individual is in a standing postion. In a weightless environment, the weight bearing stresses on the achilles ligaments are removed. As a result, these areas are prone to significant bone loss. Securing the members 18(3) under each foot and heel allows the members 18(3) when stretched to stress the achilles ligament in each leg, thus reducing loss of bone mass in that area.

A pair of knee flexures 46 may also be included, with each knee flexure 46 integrally connected with the members 18(3) located over the back of one of the knees [see FIG. 1(b)]. Typically, the members 18(3) located over the back of the knees are cut and the cut ends of the members 18(3) are secured to the edges of the knee flexures 46. The knee flexures 46 enable the members 18(3) over each leg to bend more easily. Preferably, each knee flexure 46 is made from a material, such as cotton or perforated rip stop nylon, which allows sweat to escape.

A pair of knee pads 48 may also be included, with each knee pad 48 integrally connected with the members 18(3) located over the front of one of the knees. The knee pads 48 provide sufficient padding to protect the knees. Typically, the members 18(3) located over the front of the knee are cut and the ends of the cut members 18(3) are be secured to the edges of one of the knee pads 48. Preferably, each knee pad 48 is made from a non-stretch material.

The garment 10(1) may also include an inner and/or an outer liner. The individual may wear an inner liner formed like a body-suit to protect the skin from rubbing or chafing from the members 18. The inner liner may be constructed from Lycra® or Spandex material, as well as cotton for skin comfort. The individual may also wear an outer liner formed like a body-suit over the members 18 to prevent the members 18 from becoming entangled with other equipment and gear.

Figure 2A:
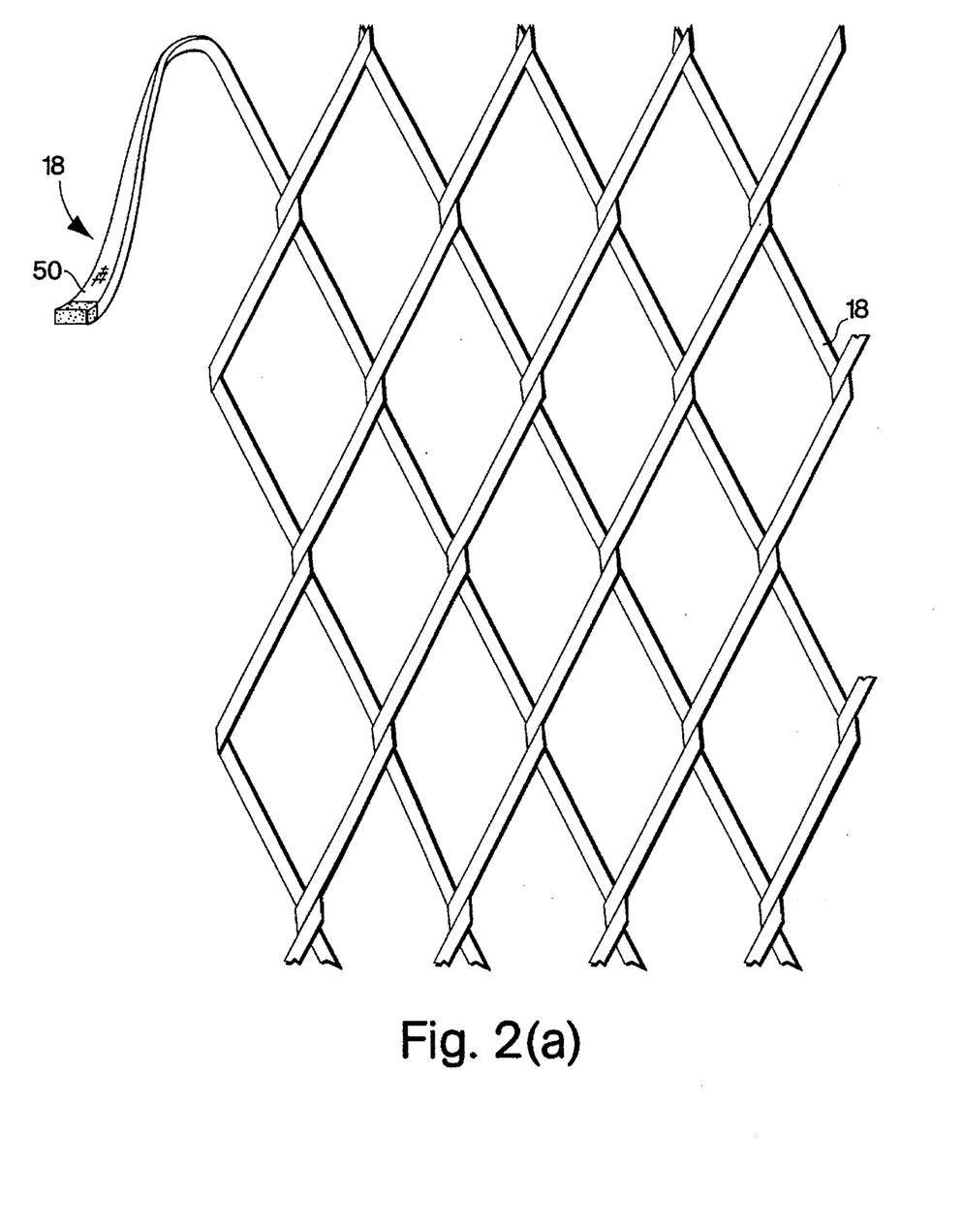
FIG. 2(a) is an enlarged fragmentary view of the interlacing elastic members used to form the garment.

FIG. 2(a) is an enlarged fragmentary view of an example of the mesh-like structure which may be formed by members 18 [i.e. 18(1), 18(2) or 18(3)] to cover the torso, arms or legs. In this example, each member 18 is formed from a single elongated strand of rubber which has a helical long axis shape. There are approximately twelve members 18 per inch or one-hundred-forty-four members 18 per square inch which intersect at 90° angles with each other, although the number of members 18 and angle of intersection can vary. The members 18 each have a rectangular cross-sectional shape. To minimize rubbing and/or chafing of the skin, each of the members 18 may have a woven or colored elastic cover 50. The optional cover 50 surrounds each member 18, but does not overly restrict the stretch of the member 18.

Rubbing and friction may also be minimized by using members 18 which have a small cross-sectional area. Minimizing the cross-sectional area reduces the surface area on the skin the members 18 cover and allows the members 18 to move more freely. As a result, the smaller members 18 chaffe less than larger members. As an example, the members 18 could have a circular cross-section of 0.5 mm.

Figure 2B:
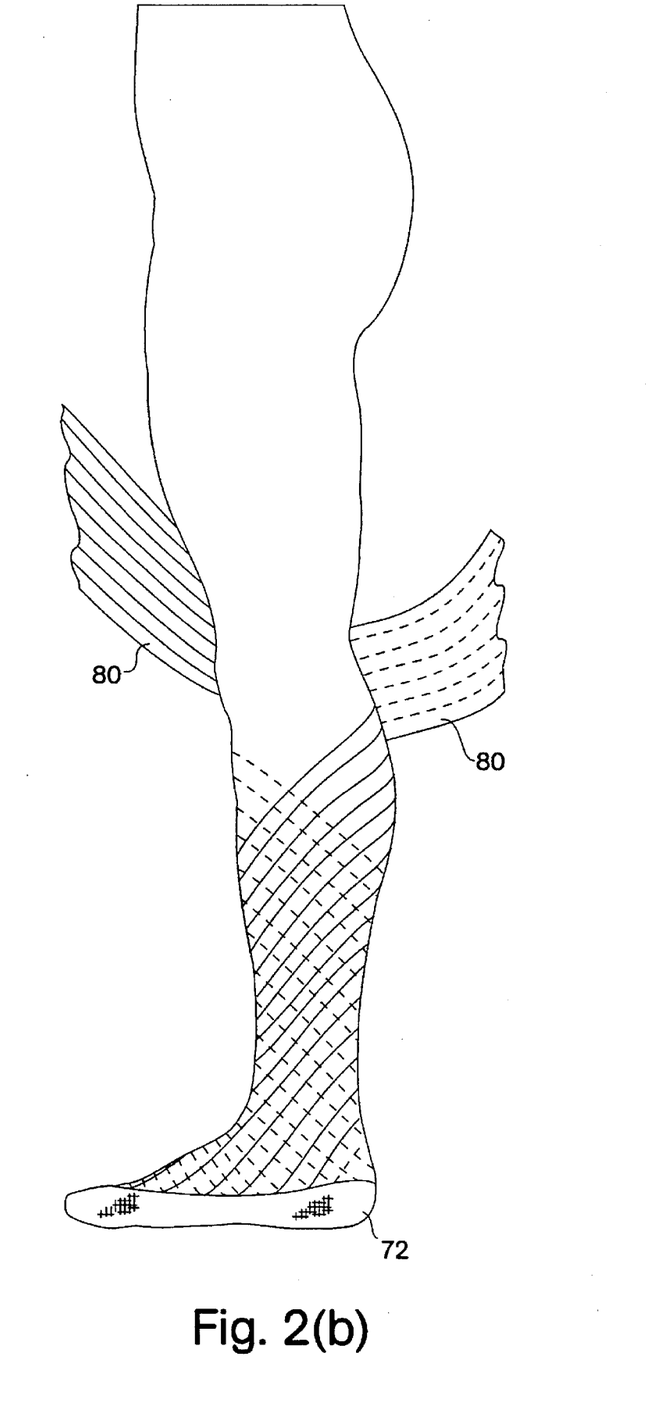
FIG. 2(b) is an enlarged view of a second embodiment of the garment having non-interlaced separate layers.

The particular members 18 used and mesh-like structure formed may vary from what is shown in FIG. 2. More particularly, each member 18 may be formed from single or multiple strands of any type of elastic or resilient material. The number of members per square inch may increase or decrease. Increasing the number of members 18 will make the garment more comfortable to wear because with more members 18 the suit will move more easily, allow perspiration to escape, and chaffe less during wear. The members 18 may also have any cross sectional shape desired and may be formed without the elastic cover 50.

FIG. 2(b) shows an alternative embodiment to the interlaced weave construction of FIG. 2(a). In FIG. 2(b), strips or layers 80 of Lycra®/cotton fabric are laid in an overlapping criss-crossing pattern. This arrangement has the advantage of mitigating the chances of runs in the garment 10(1) as well as limiting the effect of runs on the garment 10(1). The strips 80 are preferably three inches wide, however, other widths may be used. The Lycra®/cotton blend provides proper ventilation of the body by allowing heat and fluid loss. As shown, the two separate layers 80 are helically wound around the body and limbs in opposite directions.

For both elastic member embodiments as shown in FIGS. 2(a) and 2(b), Lycra® or rubber bands may be used. Lycra® may be customized for the individual user. Lycra® may also be made denser for more resistance to stretching so that different areas of the suit may be more or less resistant depending on the body portion which is covered.

The density of the fabric used should be high or compact. The denier of the fabric should be as low as practicable. Multifilament fabric is preferred because the finer and smoother the fabric, the less chance of skin discomfort.

Basically, the garment 10(1) described above operates by delivering a physical strain along the long axis of the body to the underlying bone structure and a physical strain along the short axis to the torso which is greater than the physical strain along the short axis to the limbs, particularly the legs. The physical strain delivered by the garment 10(1) along the long axis is designed to replicate the effects of gravity. Bones maintained in response to weight bearing stresses caused by gravity, are maintained in a weightless environment in response to the long axis physical strain created by the garment 10(1). When the garment 10(1) is used in a weightless environment, little if any bone mass is lost. The physical strain delivered by the garment 10(1) along the short axis must be greater across the torso than the limbs to minimize the migration of body fluids from the limbs to the torso. Minimizing the migration of bodily fluids to the torso, reduces or eliminates the possibility of experiencing hemoconcentration and/or relative dehydration while in a weightless environment and of experiencing orthostatic hypertension upon returning to a gravitational environment. The short-axis strain should not restrict the normal flow of blood. The garment 10(1) is able to generate the long axis and short axis physical strains with the members 18, as explained below.

To achieve the desired long axis and short axis physical strains, the garment 10(1) must be customized to the particular individual. The weight of the individual and the size of the individual in a first position, preferably the fetal position which represents the minimal volume for the human frame, and in an orthostatic position must be determined. Specifically, the dimensions of the individual's arms, legs, and torso in both positions must be obtained. This information is used to construct the garment 10(1) with members 18.

When constructing the garment 10(1), the length of each of the members 18 unstretched depends upon the length of the arms, legs, and torso in the first position. In this embodiment, the length of each of the members 18 matches the measured length of each body part in the fetal position. As discussed earlier, the garment 10(1) is formed by members 18(1) connected between the pad 12 and the brief 30, members 18(2) connected between the pad 12 and each arm cuff 20, and members 18(3) connected between the brief 30 and each leg cuff 42. When the garment 10(1) is constructed from the members 18 cut to the measurements obtained from the fetal position, the members 18 forming the garment 10(1) will fit snugly over the arms, legs and torso, without stretching any of the members 18 along the long axis of the body. Adjustment straps could be incorporated into the weave or secured to the outer surface of the suit to take up excess fabric.

The composition of each of the members 18 depends upon the length of the arms, legs, and torso in the orthostatic position and the weight of the individual. With the measurements of the body parts in the orthostatic position, the distance each member 18 will be stretched can be determined. With the distance of stretch and the weight of the individual, the particular composition of each of the members 18 can be selected. The garment 10(1) should be constructed with members 18 which deliver a physical strain along the long axis sufficient to maintain bones responsive to weight bearing stresses, when the members 18 are stretched to the orthostatic position. In this embodiment, the stretched members 18 should deliver a physical strain along the long axis equal to 60% to 100% of the individual's body weight, preferably 100%. By delivering a strain equal to 100% of the individual's body weight, bones responsive to weight bearing stresses should be substantially maintained in a weightless environment.

As discussed earlier, the members 18 may each have different dimensions, ranges of stretch, shapes, and number of strands among other factors. Each factor influences the amount of physical strain along the long axis the members 18 deliver when stretched. The strain each of the members 18 delivers can be changed by adjusting one or more of the factors. As a result, a variety of different compositions for the members 18 could be selected to construct the garment 10(1). For example, the members 18 selected to deliver the desired strain might each be a single strand of rubber with a rectangular cross-sectional shape which is 1 mm thick and 3 mm wide. Alternatively, the members 18 might each be a single strand of rubber which is 0.5 mm thick and 6 mm wide and still deliver the same strain when stretched. The particular composition of the members 18 will depend upon the amount of long axis physical strain needed. As discussed earlier, the amount of physical strain needed from the members 18 is determined from the distance the members 18 are stretched from the fetal to orthostatic position and the individual's body weight.

In this embodiment, when the individual wearing the garment 10(1) is in the orthostatic position, the members 18(1) and 18(2) covering the the arms and torso along the front of the garment 10(1) and members 18(3) covering the legs along the back of the garment 10(1) stretch. Meanwhile the members 18(1) and 18(2) covering the arms and torso along the back of the garment 10(1) and the members 18(3) covering the legs along the front of the garment 10(1) relax. As a result, the members 18(1) and 18(2) along the front of the garment 10(1) and the members 18(3) along the back of the garment 10(1) deliver the desired long-axis physical strain when stretched.

When members 18(1), 18(2) and 18(3) are stretched, the members 18(1), 18(2) and 18(3) deliver a long-axis strain to the body. The interlacing of these members 18(1), 18(2) and 18(3) distributes the long-axis strain across the covered portions of the body in a substantially uniform manner, instead of in one narrow region. This distribution more effectively maintains the underlying bone structure because more bone structure is exposed to the long-axis strain. Additionally, the substantially uniform distribution of long-axis strain makes the garment more comfortable to wear by minimizing narrow pressure regions. Similarly, the interlacing of the members 18(1), 18(2) and 18(3) distributes the short-axis strain across the covered portions of the body in a substantially uniform manner and also makes the garment more comfortable for wear.

The amounts of physical strain delivered along the long axis by the stretched members 18 can be adjusted for different areas of the body. Different bones in the body require different amounts of long axis physical strain to be maintained. For example, in a weightless environment the bones in the arms tend to lose less bone mass than the bones underlining the torso and the legs. The garment 10(1) could be adjusted to take this difference into account by delivering less physical strain to the arms by changing the composition of the members 18(2) used. In this example, the members 18(2) could be selected to deliver a long axis physical strain equal to 70% of the individual's body weight to the arms when stretched, while the members 18(1) and 18(3) deliver a strain equal to 100% of the individual's body weight when stretched.

The garment 10(1) may also be customized to deliver a greater short axis or lateral strain across the torso than the limbs, particularly the legs. To obtain the short axis strain, the circumference of the garment 10(1) around the torso formed by members 18(1) must be made smaller than the circumference of the torso. Similarly, the circumference of the garment 10(1) around the arms and legs formed by members 18(2) and 18(3) may also be made smaller than the circumference of the arms and legs. When the torso is slid into the garment 10(1), the members 18(1) surrounding the torso will stretch along the short axis or laterally applying pressure to the skin and delivering a strain along the short axis to the torso. When the arms and legs are slid into the garment, the members 18(2) and 18(3) may stretch along the short axis or laterally delivering a short axis strain to the arms and legs, if the members 18(2) and 18(3) are sized to stretch on the individual. The members 18(1) surrounding the torso should deliver a greater short-axis strain when stretched than that provided by members 18(2) and 18(3). The pressure differential between the members 18(1) and the members 18(2) and 18(3) along the short axis makes it more difficult for body fluids to migrate to the torso from the limbs. The pressure or short axis strain should not restrict the normal flow of blood. The suit is particularly effective in maintaining a pressure differential between the legs and torso to prevent body fluids in the legs from migrating to the torso. As a result of the greater short axis stress across the torso rather than the limbs, hemostatic distribution of body fluids is maintained.

The custom fit garment 10(1) may be put on with relative ease. Basically, the garment 10(1) is put on like a highly elastic body suit. The feet are placed in the garment 10(1) first through the opening provided by the zipper 16 in the pad 12 and are worked down and through the members 18(3) surrounding the legs. Once the legs have been worked in, the suit may be secured around the waist by belt 38 with belt loops 40. Next, the arms are worked down the members 18(2) surrounding each arm. Once the arms have been worked in, the arm cuffs 20 are secured around the wrist. Next, the head is inserted through the neck opening 14 in the pad. Finally, the zipper 16 in the pad 12 is closed.

Figure 3:
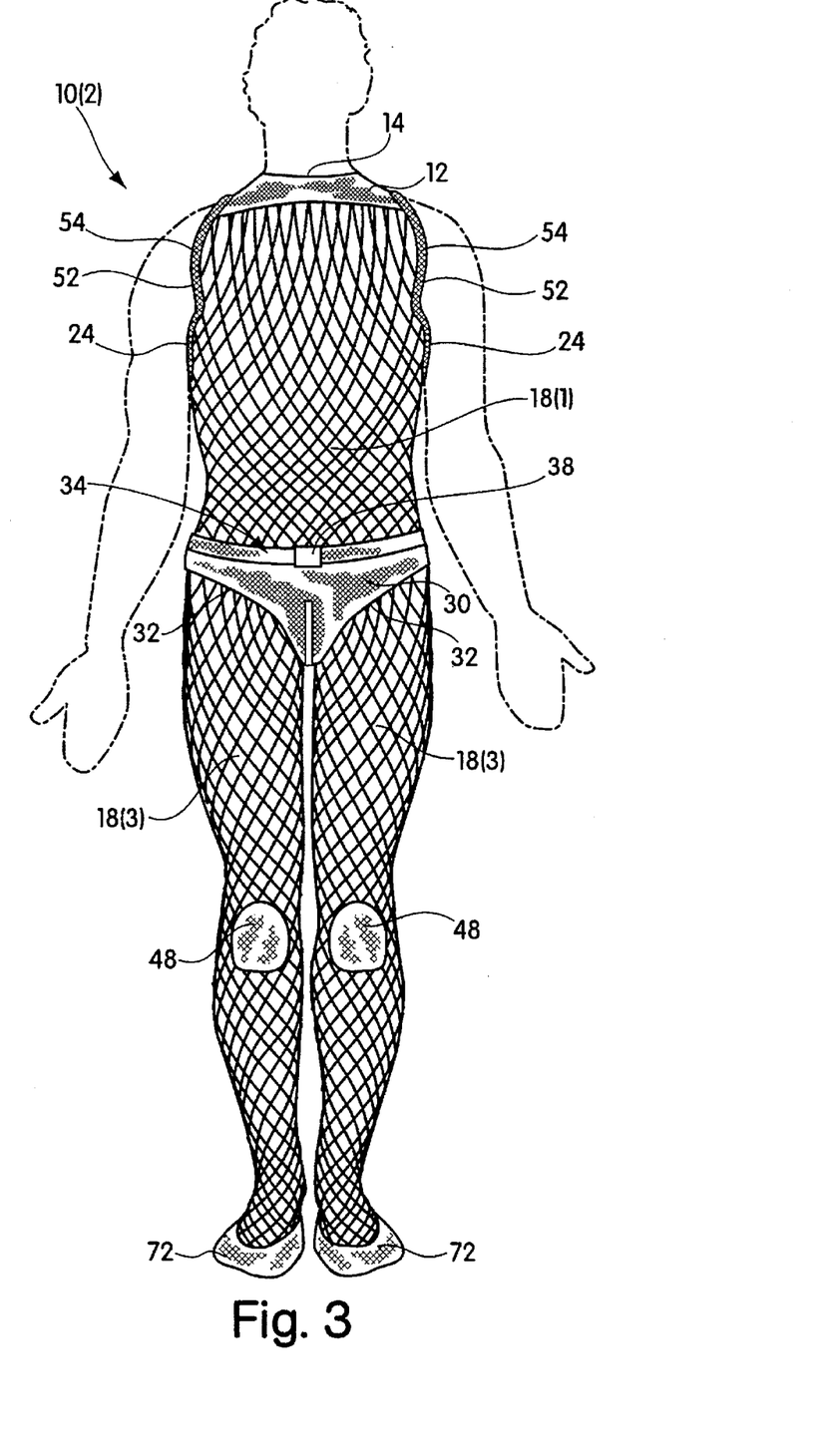
FIG. 3 is a front view of a stress transfer garment worn by an individual in an orthostatic position in accordance with a second embodiment of the invention.

FIG. 3 is a front view of a stress transfer garment 10(2) in an orthostatic position in accordance with a second embodiment of the invention. Corresponding elements in FIG. 3 have numeral designations which correspond to those numeral designations used in FIGS. 1(a) and 1(b) and will not be described again. The principle difference between the garments 10(1) and 10(2) is that with the garment 10(2) the members 18(2) do not extend down each arm. Instead, the members 18(2) only descend down to an arm opening 52 for each arm. An arm securing member 54 secures the ends of the members 18(2) on each side around each opening 52. The remainder of the garment 10(2) is substantially identical to the garment 10(1) previously described and is put on by an individual, fitted to an individual, and performs when worn by an individual in the same manner as described for garment 10(1).

Figure 4A:
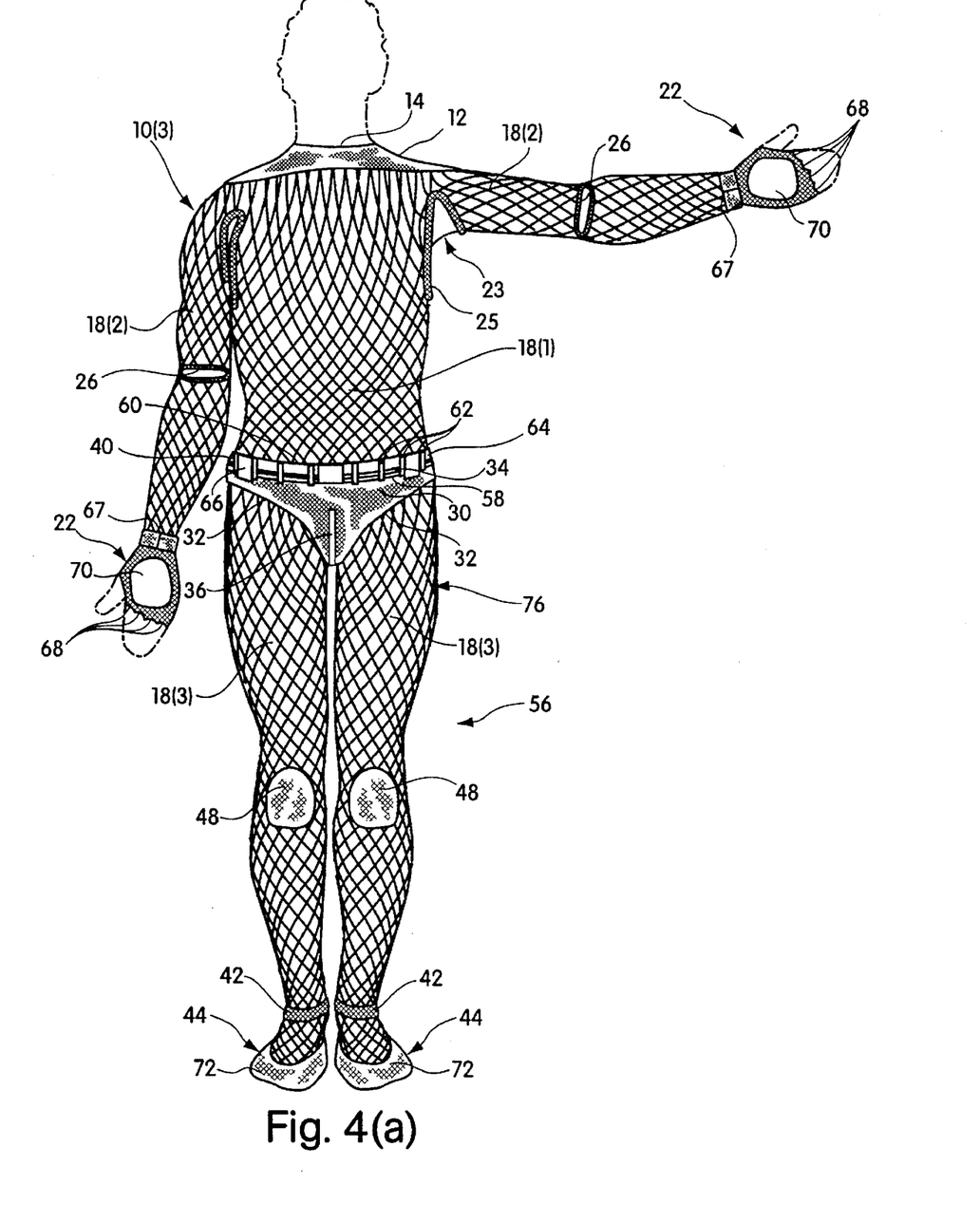
FIG. 4(a) is a front view of a stress transfer garment worn by an individual in an orthostatic position in accordance with a third embodiment of the invention.
Figure 4B:
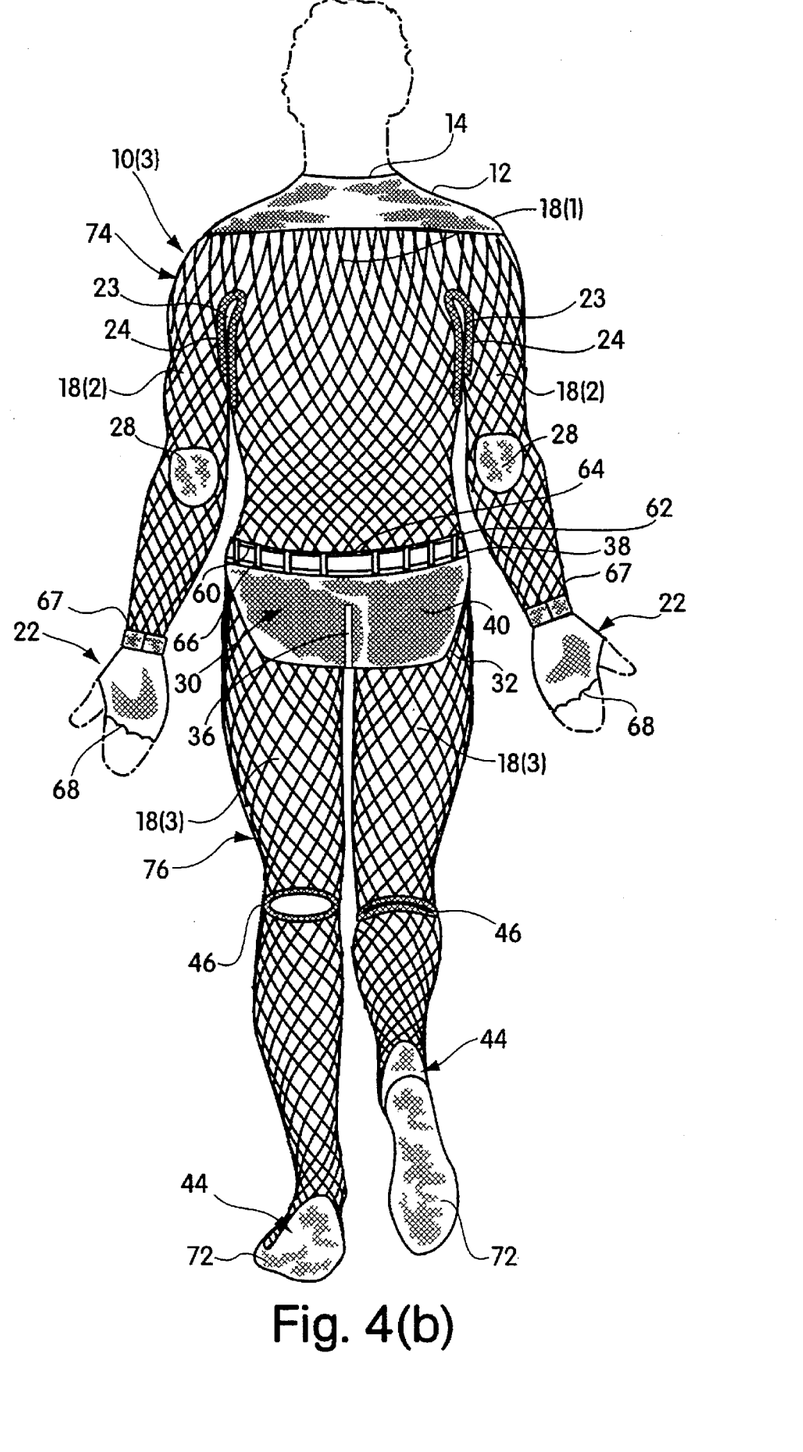
FIG. 4(b) is a back view of the stress transfer garment shown in FIG. 3(b).

FIG. 4(a) is a front view of a stress transfer garment 10(3) worn by an individual in an orthostatic position in accordance with a third embodiment of the invention and FIG. 4(b) is a back view of the garment 10(3) shown in FIG. 4(a). Corresponding elements in FIGS. 4(a) and (b) have numeral designations which correspond to those numeral designations used in FIGS. 1(a) and 1(b) and will not be described again. The principle difference between the garment 10(3) and the garments 10(1) and 10(2) is that garment 10(3) is a two-piece garment, instead of a one-piece garment. The garment 10(3) has an upper shirt-like portion 74 and a lower pants-like portion 76.

In the upper shirt-like portion 74, the other end of the members 18(1) descending down from the pad 12 are secured to a middle torso gathering member 58 which provides a middle waist opening 60. A series of second belt loops 62 may be connected to the member 58 around the waist. The loops 62 are designed to receive a second belt 64. Tightening the second belt 64 around the waist secures the member 58 around the waist sufficiently to prevent the members 18(1) from pulling the member 58 up the torso. Preferably, the second belt 64 is an adjustable Velcro belt.

The other ends of the members 18(2) surrounding each arm are secured to one of the modified gloves 22, mentioned earlier. Each modified glove 22 has a hand opening 67, finger openings 68 and a palm opening 70. The hand opening 67 and finger openings 68 must be large enough to receive the hand and fingers of the individual. The openings 68 and 70 make the modified glove 22 less restrictive on the hands. Other devices which can secure the members 18(2) to the lower part of the arm may also be used, such as the arm cuffs 20 or a different type of glove.

The upper shirt-like portion 74 includes the axillary openings 23 under each armpit, described earlier. The ends of the members 18(2) adjacent each opening 23 are each secured by one of the axillary securing members 25. The openings 23 permits the underarm areas to sweat freely. Instead of the axillary securing members 25, the ends of the members 18(2) under each armpit may be secured to one of the axillary pads 24, also described earlier.

The lower pants-like portion 76 includes the brief 30 secured around the waist opening 34 by the belt 38, as described earlier. In this embodiment, the belt 38 is used to prevent the fibers 18(3) from pulling the brief 30 down. Instead of using the belts 64 and 38, the member 58 and the brief 30 may be secured around the waist by a detachable attaching device 66. The attaching device 66 connects the member 58 to the brief 30. The device may be a pair of opposing velcro strips, with one strip on member 58 around the waist and the other strip on brief 30 around the waist.

The other end of the members 18(3) descending down each leg are secured around the lower part of the leg by the modified shoe 44 which was mentioned earlier. Other devices which would secure the members 18(3) around the foot may be used, such as a strap passing under the foot and heel. The remainder of the garment 10(3) is substantially identical to the earlier described garments 10(1) and 10(2) and is fitted to an individual in the same manner as the other garments.

The two-piece garment 10(3) is put on in a different manner than the one-piece garments 10(1) or 10(2). To put on the two-piece garment, either the lower pants-like portion 76 or the upper shirt-like portion 74 may be put on first. If the lower portion is put on first, the feet are placed in the brief 10 through the waist opening 32 and are worked down and through the members 18(3) surrounding the legs to the foot pads 72. Once the legs have been worked in, the belt 40 is passed through the belt loops 38 and is tightened to secure the brief 10 around the waist. Next, the arms, head and upper torso are placed through upper waist opening 60. The head is inserted through the neck opening 14 in the pad 12 and the hands are worked down the members 18(2) surrounding each arm and into each modified glove 22. Once the arms have been worked in, the second belt 64 is passed through the belt loops 62 and is tightened around the waist to secure the members 18(1). Once the garment 10(3) is put on, the garment 10(3) performs in the same manner as described for garments 10(1) and 10(2).

Having thus described the basic concept of the invention, it will readily apparent to those skilled in the art that the foregoing detailed disclosure is intended to be presented by way of example only, and is not limiting. Various alternations, improvements, and modifications will occur and are intended to those skilled in the art, although not expressly stated herein. These modifications, operations, and improvements are intended to be suggested hereby, and are within the spirit and scope of the invention. Accordingly, the invention is limited only by the following claims and equivalents thereto.

What is claimed is:

1. A stress transfer garment for an individual having at least one limb, each limb having a long axis, the garment being adapted to be worn on a part of the at least one limb, said garment comprising:

a plurality of strips including at least one strip wound in a first direction around the at least one limb and at least one strip wound in a second direction around the at least one limb, the at least one strip wound in the first direction and the at least one strip wound in the second direction alternately overlapping each other in a helical overlay pattern, and said part of at least one limb being covered by said plurality of strips;

said strips formed of elastic material normally unstretched when said individual wearing the garment is in a first position and stretched when said individual moves from said first position, with the stretching of said elastic material sufficient to cause the delivery of a substantially uniform strain along the long axis of the at least one limb of the individual wearing the garment to the part of the at least one limb covered by said stretched elastic material;

said stretched elastic material delivers a strain between sixty to one-hundred percent of the body weight of the individual to the underlying bone structure when moved from said first position to a second position; and wherein said individual includes a torso and each long axis has a corresponding short axis perpendicular to each long axis, wherein said strips deliver a second strain along the short axis said second strain being greater across the torso than the limbs to minimize the migration of fluids from the limbs to the torso.

2. The stress transfer garment according to claim 1 wherein said first position is the fetal position.

3. The stress transfer garment according to claim 2 wherein said second position is the orthostatic position.

4. The stress transfer garment according to claim 1 wherein said strips are disposed on the torso, the arms and legs of the individual, wherein said strips covering the torso and legs deliver a strain equal to one-hundred percent of the body weight of the individual when moved from said first position to said second position and said strips covering said arms deliver a strain equal to seventy percent of the body weight of the individual when moved from said first position to said second position.

5. The stress transfer garment according to claim 1 wherein said strips cover both legs and said elastic material surrounding each leg and are secured below each foot, said elastic material delivers a strain to each achilles ligament to minimize bone loss when stretched from said first position.

6. The stress transfer garment according to claim 5 wherein said elastic material delivers a physical strain to each achilles ligament substantially equal to 100% of the body weight of the individual when stretched to a second position.

7. A stress transfer garment for an individual having at least one limb, each limb having a long axis, the garment being adapted to be worn on a part of the at least one limb, said garment comprising:

a plurality of strips including at least one strip wound in a first direction around the at least one limb and at least one strip wound in a second direction around the at least one limb, the at least one strip wound in the first direction and the at least one strip wound in the second direction alternately overlapping each other in a helical overlay pattern, and said part of at least one limb being covered by said plurality of strips;

said strips formed of elastic material normally unstretched when said individual wearing the garment is in a first position and stretched when said individual moves from said first position, with the stretching of said elastic material sufficient to cause the delivery of a substantially uniform strain along the long axis of the at least one limb of the individual wearing the garment to the part of the at least one limb covered by said stretched elastic material;

said stretched elastic material delivers a strain between sixty to one-hundred percent of the body weight of the individual to the underlying bone structure when moved from said first position to a second position;

a shoulder width pad providing a neck opening, with one end of said elastic material covering the torso and arms secured to said pad;

first means for anchoring the other end of said elastic material covering each arm to the lower part of the arm;

a brief providing leg openings and a waist opening, with the other end of said elastic material covering the torso secured to said brief and with one end of the elastic material covering each leg secured to said brief around said leg openings; and second means for anchoring the other end of said elastic material covering each leg around the foot.

8. The stress transfer garment according to claim 7 wherein each said first means for anchoring comprises an adjustable strap.

9. The stress transfer garment according to claim 7 wherein each said first means for anchoring comprises a glove member and each said second means for anchoring comprises a shoe member.

10. The stress transfer garment according to claim 7 further comprising:

a pair of armpit pads, each said armpit pad integrally connected with said elastic material covering each arm and the torso under each armpit;

a pair of elbow flexure pads, each said elbow flexure pad integrally connected with said elastic material covering each arm in front of each elbow;

a pair of elbow pads, each said elbow pad integrally connected with said elastic material in back of each elbow;

a pair of knee flexure pads, each said knee flexure pad integrally connected with said elastic material in back of each knee; and a pair of knee pads, each said knee pad integrally connected with said elastic material in front of each knee.

11. A stress transfer garment for an individual having at least one limb, each limb having a long axis, the garment being adapted to be worn on a part of the at least one limb, said garment comprising:

a plurality of strips including at least one strip wound in a first direction around the at least one limb and at least one strip wound in a second direction around the at least one limb, the at least one strip wound in the first direction and the at least one strip wound in the second direction alternately overlapping each other in a helical overlay pattern, and said part of at least one limb being covered by said plurality of strips;

said strips formed of elastic material normally unstretched when said individual wearing the garment is in a first position and stretched when said individual moves from said first position, with the stretching of said elastic material sufficient to cause the delivery of a substantially uniform strain along the long axis of the at least one limb of the individual wearing the garment to the part of the at least one limb covered by said stretched elastic material;

said stretched elastic material delivers a strain between sixty to one-hundred percent of the body weight of the individual to the underlying bone structure when moved from said first position to a second position;

a shoulder width pad providing a neck opening, with one end of said elastic material covering the torso and arms secured to said pad;

first means for anchoring the other end of said elastic material covering each arm to the lower part of the arm;

first means for securing the other end of said elastic material covering the torso around the waist;

a brief providing leg openings and a waist opening, with one end of the elastic material covering each leg secured to said brief around said leg openings;

second means for securing the brief around the waist; and second means for anchoring the other end of said elastic material covering each leg around the foot.

12. The stress transfer garment according to claim 11 wherein each said first means for anchoring and each said first and second means for securing comprises an adjustable strap.

13. The stress transfer garment according to claim 11 wherein each said first means for anchoring comprises a glove member and each said second means for anchoring comprises a shoe member.

14. The stress transfer garment according to claim 11 further comprising:

a pair of armpit pads, each said armpit pad integrally connected with said elastic material covering each arm and the torso under each armpit;

a pair of elbow flexure pads, each said elbow flexure pad integrally connected with said elastic material covering each arm in front of each elbow;

a pair of elbow pad, each said elbow pad integrally connected with said elastic material in back of each elbow;

a pair of knee flexure pads, each said knee flexure pad integrally connected with said elastic material in back of each knee; and a pair of knee pads, each said knee pad integrally connected with said elastic material in front of each knee.

* * * * *